US011220442B2

(12) United States Patent
McMillan et al.

(10) Patent No.: US 11,220,442 B2
(45) Date of Patent: Jan. 11, 2022

(54) WASTE MATERIAL PROCESS AND PRODUCT

(71) Applicant: 3E Nutrition Limited, Christchurch (NZ)

(72) Inventors: Nicholas Robert McMillan, Christchurch (NZ); Carl Ramon Hooper, Christchurch (NZ)

(73) Assignee: 3E NUTRITION LIMITED, Christchurch (NZ)

(*) Notice: Subject to any disclaimer, the term of this patent is extended or adjusted under 35 U.S.C. 154(b) by 300 days.

(21) Appl. No.: 15/127,685

(22) PCT Filed: Apr. 1, 2015

(86) PCT No.: PCT/IB2015/052380

§ 371 (c)(1),
(2) Date: Sep. 20, 2016

(87) PCT Pub. No.: WO2015/155631

PCT Pub. Date: Oct. 15, 2015

(65) Prior Publication Data

US 2018/0170782 A1 Jun. 21, 2018

(30) Foreign Application Priority Data

Apr. 7, 2014 (NZ) ........................................ 623538

(51) Int. Cl.
*C02F 1/24* (2006.01)
*C02F 11/127* (2019.01)
(Continued)

(52) U.S. Cl.
CPC ................ *C02F 1/24* (2013.01); *A23K 10/26* (2016.05); *A23K 10/28* (2016.05); *C02F 11/121* (2013.01);
(Continued)

(58) Field of Classification Search
CPC ................................ C02F 11/123; C02F 1/24
See application file for complete search history.

(56) References Cited

U.S. PATENT DOCUMENTS 2,772,234 A 11/1956 Kelly
3,093,572 A 6/1963 Benedict
(Continued)

FOREIGN PATENT DOCUMENTS

CN 103539315 A 1/2014
CN 103553257 A 2/2014
(Continued)

OTHER PUBLICATIONS

Dissolved Air Flotation (DAF) Sludge Dewatering Systems for processing food and dairy, meat, fish and poultry rendering, and waste vegetable oils applications to remove suspended solids, fats, oils and greases from a variety of wastewaters, by Hiller Separation & Process, published at: http://hiller-us.com/daf-sludge-dewatering.php.

(Continued)

*Primary Examiner* — Peter Keyworth
(74) *Attorney, Agent, or Firm* — Saliwanchik, Lloyd & Eisenschenk

(57) ABSTRACT

A method of producing a final product from a wastewater dissolved air flotation (DAF) sludge which includes the following dewatering step: 5—dewatering of the sludge, an aged sludge or a pre-processed sludge to produce a sludge filter cake and a filtrate; such that the pre-processed is sludge, or aged sludge, that has undergone additional processing steps prior to dewatering and aged sludge is sludge that has been stored for a period of time, wherein the dewatering step is a mechanical dewatering step 10 carried out at a maximum of 30° C. which results in a sludge filter cake that does not flow under its own mass.

19 Claims, 5 Drawing Sheets

-22-
24
31
11
-2-
10
-3-
20
-4-
30
-5-
23
40
21
60
-61-
50
-6-

(51) Int. Cl.

| | |
|---|---|
| ***A23K 10/28*** | (2016.01) |
| ***C02F 11/126*** | (2019.01) |
| ***A23K 10/26*** | (2016.01) |
| ***C02F 11/13*** | (2019.01) |
| ***C02F 11/121*** | (2019.01) |
| ***C02F 11/147*** | (2019.01) |
| ***C02F 11/123*** | (2019.01) |
| *C02F 103/32* | (2006.01) |
| *C02F 103/22* | (2006.01) |

(52) U.S. Cl.

CPC .......... *C02F 11/123* (2013.01); *C02F 11/126* (2013.01); *C02F 11/127* (2013.01); *C02F 11/13* (2019.01); *C02F 11/147* (2019.01); *C02F 2103/22* (2013.01); *C02F 2103/327* (2013.01); *C02F 2301/063* (2013.01); *Y02W 10/37* (2015.05)

(56) References Cited

U.S. PATENT DOCUMENTS

| | | | | |
|---|---|---|---|---|
| 3,951,795 A | | 4/1976 | Doncer et al. | |
| 4,282,256 A | | 8/1981 | Evich et al. | |
| 4,969,928 A | | 11/1990 | Wen et al. | |
| 5,098,572 A | * | 3/1992 | Faup | C02F 3/1215 210/605 |
| 5,507,954 A | | 4/1996 | Carrillo | |
| 5,514,282 A | * | 5/1996 | Hibbard | B01D 61/04 210/195.2 |
| 5,540,836 A | | 7/1996 | Coyne | |
| 5,637,221 A | | 6/1997 | Coyne | |
| 5,759,568 A | | 6/1998 | Mosley, Sr. | |
| 6,919,027 B2 | | 7/2005 | Wallin et al. | |
| 7,056,441 B1 | | 6/2006 | Menke et al. | |
| 7,497,956 B2 | | 3/2009 | Blais et al. | |
| 2005/0113611 A1 | | 5/2005 | Adams et al. | |
| 2009/0114602 A1 | | 5/2009 | Logan et al. | |
| 2011/0290722 A1 | * | 12/2011 | Mitchell | C02F 9/00 210/620 |
| 2012/0246965 A1 | * | 10/2012 | Zhong | C02F 11/12 34/386 |
| 2012/0329139 A1 | | 12/2012 | Dvorak | |
| 2015/0239164 A1 | * | 8/2015 | Penkwitt | F26B 1/005 425/382 R |

FOREIGN PATENT DOCUMENTS

| | | | | |
|---|---|---|---|---|
| EP | 2484640 A1 | | 8/2012 | |
| JP | 1034199 A | | 2/1998 | |
| WO | 81/02888 A1 | | 10/1981 | |
| WO | WO-93/15026 A1 | * | 2/1993 | C02F 11/12 |
| WO | 2008/068820 A1 | | 6/2008 | |
| WO | 2009/059163 A1 | | 5/2009 | |
| WO | 2013/139959 A1 | | 9/2013 | |

OTHER PUBLICATIONS

Dissolved Air Flotation (DAF) VLT Series Systems, by Ecologix Environmental Systems, published at: http://www.ecologixsystems.com/system-v-series-daf.php.

Rotorua Wastewater Treatment Plant, published at: http://www.baybuzz.co.nz/wp-content/uploads/2008/01/rotorua-wastewater-treatment.pdf.

Case Study 11—Dissolved Air Flotation—FSA Consulting, published at: http://www.fsaconsulting.net/pdfs/Case%20Study%2011%20-%20DAF.pdf.

Dissolved Air Flotation (DAF), Trade Waste Guideline., SA Water, Government of South Australia (pub), Mar. 1, 2013 [online], [retrieved from the Internet on Sep. 15, 2016], https://www.sawater.com.au/__data/assets/file/0011/11405/DissolvedAirFloatationDAF.pdf.

“The handbook of Non-metallic Processing and Application” Shuilin Zheng etc. Metallurgical Industry Publishing Group, p. 361-365, the 1st edition, May 2005 May 31, 2005.

“Fundamental Water Contamination Control Engineering” Yongbo Lin etc. Harbin Institute of Technology Publishing Group, p. 333-335, the 1st edition, Nov. 2010. Nov. 30, 2010.

“The Design Manual on Treatment of electroplating wastewater” The Second Design Institute of Ministry of Machinery Building etc. Zhejiang Science and technology Publishing Group, Oct. 1987. the 1st edition , p. 252-253 Oct. 31, 1987.

EP 09 84 9647, Supplementary European Search Report, dated May 27, 2014

Thiele J. H., “Future proofing our wastewater treatment infrastructure.” Proceedings of the Water New Zealand Annual Conference. 2012. Rotorua Energy Events Centre, Sep. 26-28, 2012.

Jess Daly (Beca), Bram Beuger (Fonterra), “Challenges and Innovations in Dairy Factory Wastewater Treatment”, section 3.2 (sourced from https://www.waternz.org.nz/Attachment?Action=Download&Attachment_id=1655).

“Rotary Lobe Positive Displacement Sludge Pumps for Pumping Sludge” http://www.lobepro.com/fund-why-choose-lobepro-12-reasons.php.

Office Action dated Sep. 3, 2018 from Chinese Application No. 201580018841.8.

* cited by examiner

WASTE MATERIAL PROCESS AND PRODUCT

TECHNICAL FIELD

The present invention relates to a process for treating waste material, more specifically dairy processing plant waste water material after dissolved air flotation treatment.

BACKGROUND ART

Modern dairy processing plant produce a large quantity of wastewater which is generally treated by adding a flocculent and passing through a dissolved air flotation (DAF) plant. In many cases the DAF plant reduces suspended solids by over 80%, the biological oxygen demand by over 60% and removes over 90% of the oil and grease, this reduces the loading on sewage systems dramatically and so they are often employed.

In a DAF plant micro-bubbles of air are introduced to the flocculent treated wastewater, these bubbles float the flocked material to the surface forming a floated solid which is skimmed from the surface and disposed of. The floated solid material is sometimes called sludge in the dairy or meat industry. There may be a collection tank where the sludge is collected. In the collection tank the sludge further thickens prior to disposal or further treatment.

The sludge typically contains between 10% and 20% solids and as such there is still a significant quantity of water present and this increases the volume of material to be disposed of. The majority of sludge is ground spread, land filled or drilled into pasture, and though it acts as a fertiliser it has an adverse environmental impact so there is pressure to eliminate the practice. To reduce the volume of material that needs to be disposed of, and recover water from the sludge it is sometimes further treated by processing aid then filtering. The filter cake formed can then be disposed of or, in some cases, further treated. The most commonly used processing aid is diatomaceous earth or pearlite and this adds an indeterminate amount of silica/silicon to the filter cake which can render it unsuitable for feedstock. The high silica/silicon filter cake is unsuitable as a feedstock as only limited amounts of silicon are required in most animals diets, in addition silica can cause undue wear on the teeth of animals to which it is fed.

There have been attempts made to dry this sludge but the oils/fats often break from the filter cake creating a messy product which is either uneconomical or unsuitable for any downstream use.

Any discussion of the prior art throughout the specification is not an admission that such prior art is widely known or forms part of the common general knowledge in the field.

It is an object of the present invention to provide a method of treating DAF plant sludge to produce a useful by-product, or provide the consumer with a useful choice.

DISCLOSURE OF INVENTION

The present invention provides a method of producing a final product from a wastewater dissolved air flotation (DAF) sludge which includes the following dewatering step:

- dewatering of the sludge, an aged sludge or a pre-processed sludge to produce a sludge filter cake and a filtrate;

such that the pre-processed is sludge, or aged sludge, that has undergone additional processing steps prior to dewatering and aged sludge is sludge that has been stored for a period of time, wherein the dewatering is a mechanical dewatering process carried out at a maximum of 30° C. which results in a sludge filter cake that does not flow under its own mass.

Preferably the dewatering step is carried out at no more than 20° C. In a still more preferred form the temperature is between 2° C. and 18° C.

In a preferred form the pre-processed sludge is sludge or aged sludge that has been diluted with water and/or filtrate. Preferably the temperature of the water and/or filtrate is below 20° C., or in a highly preferred form 10° C. Preferably 35% (vol/vol) or less water and/or filtrate is added.

Preferably the wastewater is dairy wastewater or abattoir/meat/fish/poultry processing plant waste. Preferably the sludge is high in protein.

In a preferred form the pre-processed sludge is a sludge or aged sludge that has had a proportion of the oils and fats removed.

Preferably the dewatering step is carried out using a vacuum filtration unit. Preferably the vacuum filtration unit includes a screen or filter cloth with 50 micron or less apertures. In a highly preferred form the dewatering step is carried out in the presence of a processing aid. Preferably said processing aid is fibrous. In a highly preferred form the processing aid is a cellulosic or lignocellulosic material, often a filter aid. In a most preferred form the processing aid is not mineral based.

Preferably the aged sludge is sludge that has been stored in a tank from 0 to 40 days.

Preferably the dewatering step occurs in the presence of an organic processing aid.

Preferably the dewatering step is a mechanical dewatering step that includes the use of a vacuum filtration step. Preferably the vacuum step includes the use of a rotary drum vacuum filter (RDV) or horizontal vacuum filtration table (HVFT). Preferably the mechanical dewatering step creates a filtrate and a retentate, where the filtrate is an aqueous liquid and the retentate is the sludge filter cake.

Preferably the mechanical dewatering step is carried out with the sludge or aged sludge at a temperature of below 40° C. In a highly preferred form the mechanical dewatering step is carried out with the sludge or aged sludge at a temperature of below 14° C. In a still more preferred form the temperature of the sludge or aged sludge is between 2° C. and 18° C.

Preferably the sludge filter cake is processed to form a PD sludge, where the PD sludge has a maximum thickness of about 10 mm and a surface area to volume ratio of 3:5 or greater.

Preferably the dewatering step is followed by extrusion of the sludge filter cake step to form a PD sludge, where the PD sludge has a maximum thickness of about 10 mm and a surface area to volume ratio of 3:5 or greater. Preferably this extrusion is a low shear extrusion step.

Preferably prior to the extrusion step an organic processing aid is added to the sludge filter cake to form a sludge putty. Preferably this sludge putty is extruded to form a PD sludge, where the PD sludge has a maximum thickness of about 10 mm and a surface area to volume ratio of 3:5 or greater.

Preferably the extrusion step is carried out using an extruder which includes a die which has one or more die apertures that have a maximum trans-axial cross sectional dimension of between 0.1 mm and 40 mm. In a highly preferred form the maximum trans-axial cross sectional dimension is between 1 mm and 10 mm. In a still more preferred form the maximum trans-axial cross sectional dimension is between 1 mm and 5 mm.

Preferably the extrusion step is followed by a drying step to form a dried product from the PD sludge.

Preferably the drying step is a low temperature drying process using a high volume of low temperature air, below 70° C., air passing over the PD sludge. Preferably the drying is carried out using air at or below 50° C., or even more preferably using air at or below 30° C. Preferably the dried product has greater than 90% solids and, in a highly preferred form, greater than 95% solids.

Preferably the dried product is further processed to form a final product. In one form the final product is a feed or feed supplement for animals. In an alternative form the final product is a fuel or fuel supplement for energy or heat production.

Preferably the organic processing aid is cellulose, lignocellulose or lignin based. In a highly preferred form the organic processing aid is a fibrous cellulosic material.

Preferably prior to the extrusion step the cellulosic content of the sludge filter cake is adjusted.

The present invention also includes a final product which is an animal feed product or supplement, or a fuel or fuel supplement for energy or heat production. The invention also includes a final product produced by the method described earlier.

The present invention also includes a processing plant that includes a mechanical dewatering unit, an extruder and a drier.

Preferably the dewatering unit includes a perforated surface and a filter with a pre-coat formed from an organic processing aid. Preferably the organic processing aid is cellulose or based on a cellulosic material. Preferably the organic processing aid is fibrous.

Preferably the mechanical dewatering unit is a vacuum filter that includes a perforated drum or belt. Preferably the organic processing aid is used to form a pre-coat onto the perforated drum or belt. Preferably the sludge retained on the pre-coat is the retentate and the liquid phase passing through the pre-coat is the filtrate, such that the retentate and a proportion of the pre-coat forms the sludge filter cake.

Preferably the extruder has one or more die apertures that have a maximum trans-axial cross sectional dimension of between 0.1 mm and 40 mm. In a highly preferred form the maximum trans-axial cross sectional dimension is between 1 mm and 10 mm. In a still more preferred form the maximum trans-axial cross sectional dimension is between 1 mm and 5 mm.

Preferably the drier operates at a temperature below 200° C. at a predetermined humidity, for a predetermined time.

The present invention further includes an alternative method of producing a final product from a wastewater dissolved air flotation (DAF) sludge which includes an extrusion step which is:

extrude a material to form a PD sludge, where said material is selected from the list consisting of a sludge, an aged sludge and a pre-processed sludge, such that said material does not flow under its own mass;

such that the extrusion step is carried out using an extruder which includes a die which has one or more die apertures that have a maximum trans-axial cross sectional dimension of between 0.1 mm and 40 mm, and preferably the PD sludge has a maximum thickness of about 10 mm, and a surface area to volume ratio of 3:5 or greater.

In a highly preferred form the maximum trans-axial cross sectional dimension is between 1 mm and 10 mm. In a still more preferred form the maximum trans-axial cross sectional dimension is between 1 mm and 5 mm.

Preferably the extrusion step is followed by a drying step to produce the final product.

Preferably the drying step is a low temperature drying process using a high volume of low temperature air, below 70° C., air passing over the PD sludge. Preferably the drying is carried out using air at or below 50° C., or even more preferably using air at or below 30° C. Preferably the dried product has greater than 90% solids and, in a highly preferred form, greater than 95% solids.

Preferably the alternative method includes a dewatering step prior to the extrusion step similar to that detailed in the first method.

Preferably the dewatering step is a mechanical dewatering step that includes the use of a vacuum filtration step. Preferably the vacuum step includes the use of a rotary drum vacuum filter (RDV) or horizontal vacuum filtration table (HVFT). Preferably the mechanical dewatering creates a filtrate and a retentate, where the filtrate is an aqueous liquid and the retentate is the sludge filter cake.

Preferably the dewatering step is carried out with the sludge or aged sludge at a temperature of below 40° C. In a highly preferred form the dewatering step is carried out with the sludge or aged sludge at a temperature of below 14° C. In a still more preferred form the temperature of the sludge or aged sludge is between 2° C. and 18° C.

Preferably the wastewater is dairy wastewater or abattoir/meat/fish/poultry processing plant waste. Preferably the sludge is high in protein.

BRIEF DESCRIPTION OF DRAWINGS

By way of example only, a preferred embodiment of the present invention is described in detail below with reference to the accompanying drawings, in which.

DEFINITIONS

Breaking: In this context breaking, when referring to 'breaking of the oil/fat' refers to a proportion of the oil/fat content of the material in question being released as unbound oil/fat.

Cellulosic: This is intended to include lignocellulosic materials as well.

Mechanical dewatering: A mechanical or physical, rather than chemical or thermal, process for removing some or all of the water from a material containing solids and water.

Tube: This is intended to include hollow elongate members which have a cross sectional shape, of either the outer surface or the void within, other than circular or oval, for example triangular, rectangular, star shaped, hexagonal, octagonal, elliptical, oval, so a tube includes rectangular hollow section as well as pipe.

First Mode for Carrying Out the Invention

The method and plant will be described with reference to a dairy plant but it could equally refer to other processing plants that include a dissolved air flotation unit to process some or all of their wastewater.

Figure 1:
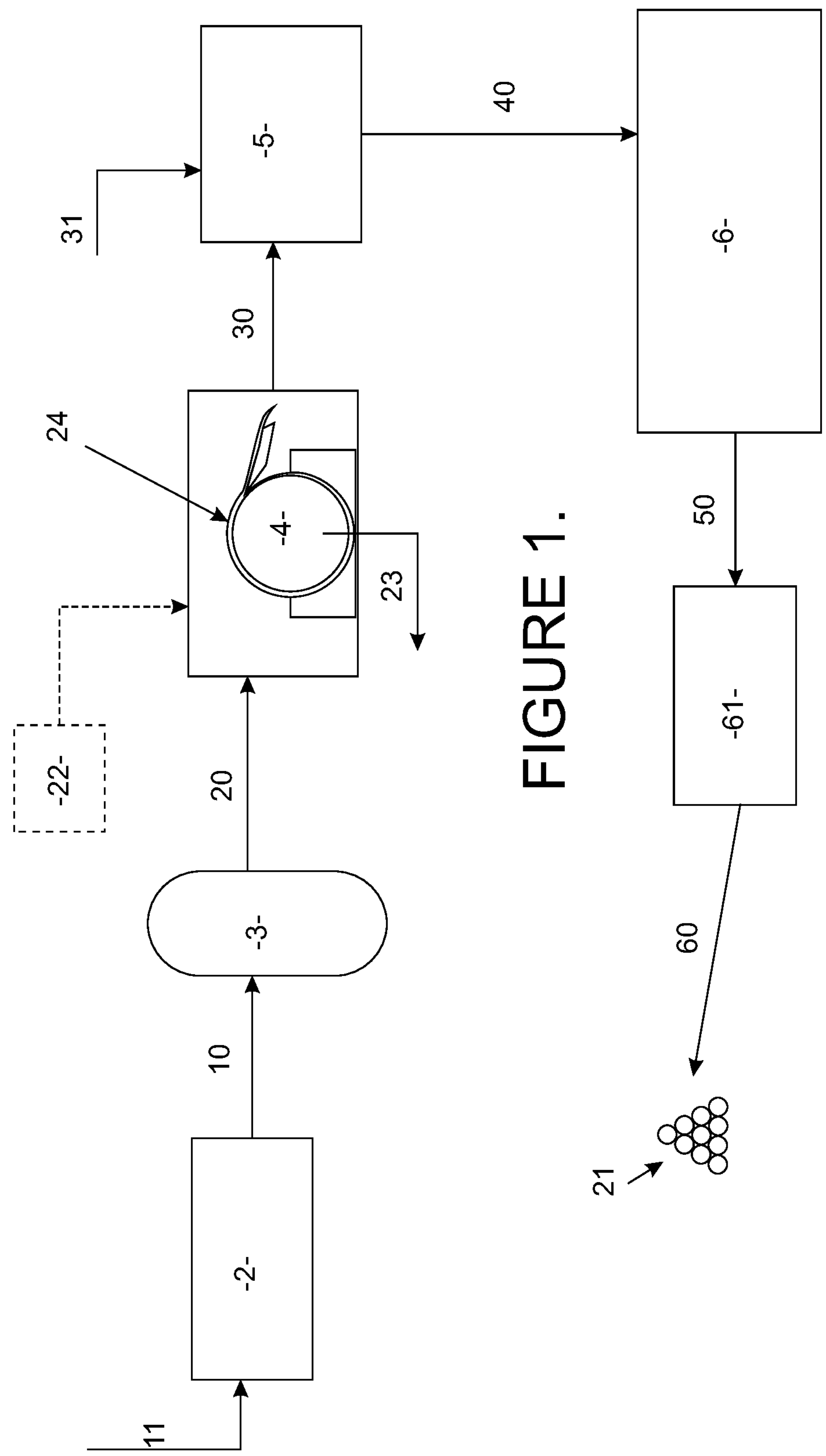
FIG. 1 is a process diagram.

Referring to FIG. 1 a process diagram of the dairy waste material process plant (1) is shown. The dairy waste material process plant includes:

a dissolved air flotation (DAF) plant (2);
a sludge tank (3);
a rotary drum vacuum (RDV) filter (4);
an additive unit (5); and
extrusion apparatus (6).

The DAF plant (2) will often be part of the standard dairy wastewater treatment apparatus and it is expected this will operate in the normal way. This said the DAF plant (2) may have specific flocculants or other additives excluded or added to optimise the operation of the dairy waste material process plant (1).

The DAF plant (2) creates a sludge (10) by introducing fine air bubbles to a dairy wastewater stream (11) which has often been pre-treated with one or more flocculants (12). The fine air bubbles suspend the flocculated material (which includes acid coagulated proteins) to form the sludge (10). The sludge (10) is skimmed from the surface of the treated wastewater, and/or removed from the base of the processing vessel, in the DAF plant (2) and transferred to the sludge tank (3). In many dairy wastewater treatment plants the sludge tank (3) is already present.

The contents of the sludge tank (3) are normally between 10% and 30% solids and they are allowed to age for a period of time to 'stiffen' and form an aged sludge (20) suitable for further processing. This aged sludge (20) does develop specific properties desirable for some forms of the final product (21) and the aging period will depend on the final product (21) and one or more of the following components in the sludge (10) protein, fat/oil and dissolved salts. This aging may affect the ratio between the various components and/or overall composition of the contents of the sludge tank (3) as fermentation and other microbiological processes will occur over time. It should be noted that this step is optional and it is expected that in some cases the aged sludge (20) will simply be the contents of the sludge tank (3) essentially as removed from the DAF plant (2).

The aged sludge (20) is then filtered using a vacuum filter (4) with a pre-coat filter formed from an organic processing aid (22). It has been found that a processing aid (22) manufactured from fibrous cellulose is particularly suitable. By using a fibrous organic processing aid (22) rather than a mineral based processing aid (22) there is little or no silica or silicon addition to the filter cake. The use of a processing aid (22) is optional.

An RDV filter (4) operates by having a low pressure cavity surrounded by a perforated surface, the perforated surface may have a filter cloth applied or be fine enough to allow the processing aid (22) to form the pre-coat without a filter cloth. In some embodiments there may simply be a filter cloth with no added processing aid (22).

The aged sludge (20) to be filtered is made available to the high pressure (atmospheric in most cases) side of the pre-coated perforated surface, a proportion (up to 100%) of the liquid phase passes through the pre coat or filter cloth to the low pressure void as filtrate (23) and a low water content solid rich phase is retained by the pre-coat as retentate (24). The perforated surface is either the perforated surface of a moving drum or a moving belt which passes through a tank containing the aged sludge (20) then back into the air. The low pressure void pulls first liquid then air through the retentate (24) on the perforated surface reducing the liquid content still further. The retentate (24) and a proportion of the pre-coat filter (where present) is removed from the perforated surface by a blade as a sludge filter cake (30). The blade is normally a fixed or stationary blade as the drum or belt is moving, the blade is intended to cover any member used to remove the filter cake (30) from the drum, filter cloth or belt. The perforated surface, with the remaining pre-coat or filter cloth, passes back into the tank containing the tank containing the aged sludge (20). As can be seen, though the filter is described as a RDV filter (4), it is a perforated surface vacuum filtration unit which may be a horizontal belt vacuum filter or any other suitable form of vacuum filtration. The aged sludge (20) may be diluted with water and/or filtrate (23) to be sufficiently fluid to be processed.

It has been found that to improve the effectiveness of this filtration/dewatering stage that water, preferably low temperature (below about 25° C.) water, can be added. It is not yet understood what the added water does, and it has been found that a proportion of the filtrate (23) can be recycled and added to have the same effect. Trials so far have shown that the addition of up to about 35% water and/or filtrate (chilled) can improve the dewatering step, why this addition of water improves the removal of water during the filtration stage is not yet understood. Trials are ongoing to determine the useful range of added water and it may be that the amount added is related to the concentration of one or more chemical species in the sludge (10) or aged sludge (20), the breakdown of flocculated material allowing interstitial water to be removed, reduced viscosity of the material to be processed, or a combination of these and other parameters, but this has not been determined.

The aged sludge (20) has a variable composition which includes low melting point species, likely to be triglycerides of fatty acids. It has been found that this variable composition affects this filtration, and to prevent breaking of the oil/fat it is best carried out below 30° C. The best processing conditions are below 20° C., possibly between 2° C. and 18° C. This low temperature filtration has been found surprisingly effective, and the industry has been carrying out filtration at elevated, >45° C. with limited success so it was not expected.

The sludge filter cake (30) is normally over 30% solids and the filtrate (23) is typically low (less than about 1%) in protein, fats and ash. From initial trials the where a cellulosic processing aid (22) is used the cellulose content from the processing aid (22) of the sludge filter cake (30) is between about 1% and 5%, though it is thought that up to 50% may be advantageous. However, whether this cellulose content is accomplished by adding the organic processing aid (22) to the aged sludge (20), later added to the sludge filter cake (30) or a combination of these is likely to be dependent upon the feed material.

The sludge filter cake (30) is then optionally blended with a variety of additives (31) in the additive unit (5) to form a sludge putty (40). The additives (31) could include silica, modified starch, modified carbohydrates, carbohydrates, marine or rice hulls, cellulose, high surface binding agents, minerals, micronutrients, anti-caking agents, absorbents, etc. The full range of additives (31) is yet to be determined but cellulose and various absorbents have been found to assist with the later drying and handling stages. It is felt that organic additives (31) are preferably.

The sludge putty (40) is then extruded through the extrusion apparatus (6) to form PD sludge (50) as the extrudate. It has been found that the use of high shear extruders can result in a breaking of the extrudate, that is the oils and fats separate forming a sticky difficult to handle material, as such it is preferred that the extrusion apparatus used is, or includes, a low shear extruder (for example a forming extruder).

It has been found that the sludge putty (40) should optimally be sufficiently coherent to not flow under its own mass, it can to a certain extent deform, break or crumble, but not flow.

Where used the extrusion apparatus (6) should have a die with a maximum trans-axial die aperture cross sectional dimension of between 0.1 mm and 40 mm, where a solid rather than tubular extrudate is being formed. The optimum range believed to be between 1 mm and 5 mm unless hollow/tubular extrudate is formed. As the sludge putty (40) is extruded it expands forming the PD sludge (50). To aid with later processing it is beneficial to have corrugations on the surface of the PD sludge (50) though these can be formed purely by the expansion upon exit from the die, be part of the die aperture shape or a combination of these.

It has been found that there is a preferred maximum thickness and range of surface area to volume for the PD sludge (50) produced from dairy sludge prior to drying. The maximum thickness of material, when processing dairy DAF, is about 10 mm (say up to 12.5 mm or 0.5") and the surface area to volume ratio is preferably 3:5 or greater. A tubular extrudate has an interior surface area which improves this ratio, but this improvement will most likely depend on the dimensions of the void. Please note that a surface area to volume ratio of 4:5 is greater than a surface area to volume ratio of 3:5 as the surface area has increased relative to the volume.

It should be noted that the extrusion apparatus (6) may simply involve pushing the sludge putty (40) through a mesh with apertures of the required shape and dimensions.

The extrusion apparatus (6) may also form the PD sludge (50) into predetermined, fixed or random lengths to aid with later processing.

To form an optimum PD sludge (50) it is felt that the temperature should be kept relatively low, below 35° C. is preferred.

After extrusion the PD sludge (50) needs to be dried in a drier (61) to form a dried product (60) prior to any further processing and packaging required to form the final product (21).

This drying may be possible by natural air drying but air drying with a high volume of low temperature (below 200° C.) air is one preferred method. A variety of other low temperature drying options are being investigated. Fluidised bed drying is being investigated as are a variety of infra-red/solar/dehumidification/rf/microwave/low pressure drying technologies and the final solution is likely to be a combination of these. It has been found that drying to 20% or below moisture content is preferred, but less than 5% appears to have additional benefits. Typically when the raw feedstock is dairy DAF this is around 96% solids As the PD sludge (50) is dried to form the dried product (60) physical and/or chemical changes appear to occur that reduce or eliminate the breaking of the oil/fat even when the dried product is exposed to elevated (above 25° C.) temperatures.

Figure 2:
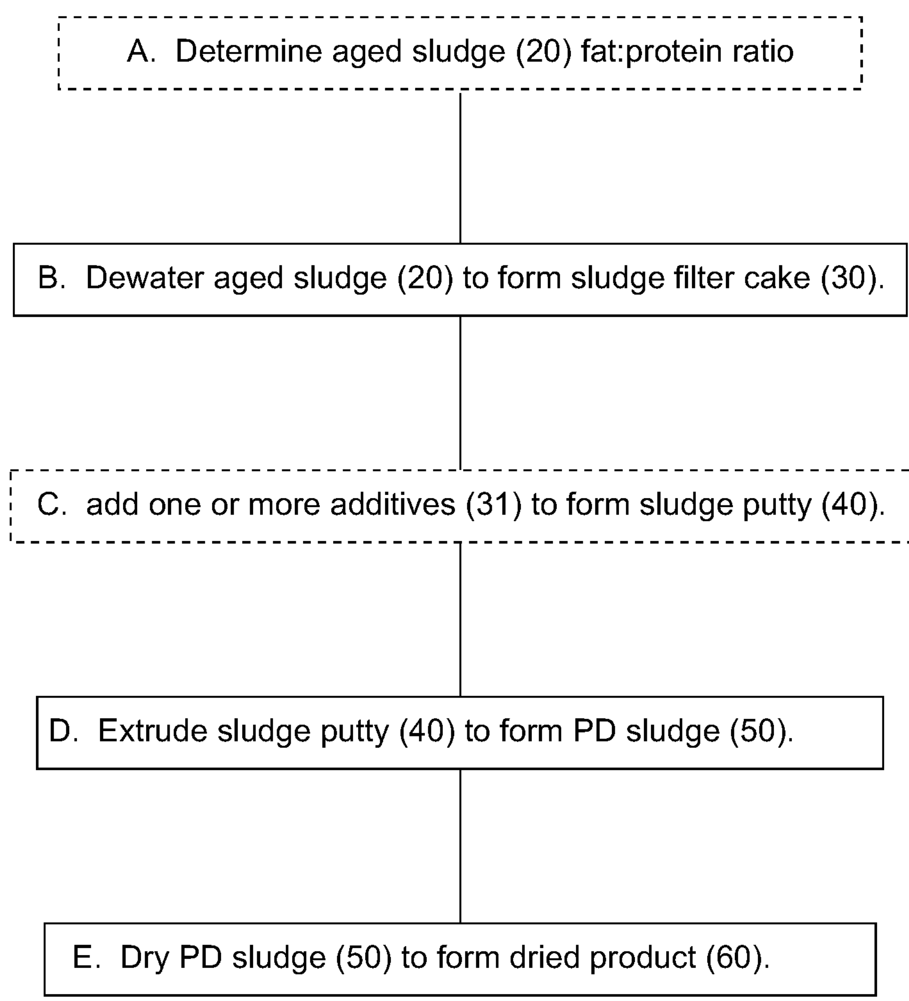
FIG. 2 is a flow chart of a preferred method of using the processing equipment.

Referring to FIG. 2 the present invention also includes a preferred method of using the dairy waste material process plant (1). The steps in dashed boxes are optional and may not always be present.

The method includes the following steps in order:

A. Determine aged sludge fat:protein ratio (optional);

B. Dewater aged sludge to form sludge filter cake;

C. Add additive (optional);

D. Extrude (preferred but optional); and

E. Dry.

Where, in step A, which is optional, the fat to protein ratio of the aged sludge (20) is determined by any known means. It is possible that the sludge (10) fat to protein ratio is used but this may not take into account any changes that occur during aging, so is unlikely to be used except where the aging is between 0 and 3 days.

In step B the aged sludge (20), which can be simply the sludge (10) from the DAF plant (2), is mechanically dewatered, preferably by some form of vacuum filter, but any mechanical dewatering process, including centrifuges and vacuum filtration units, can be used. Essentially this creates a sludge filter cake (30). This sludge filter cake (30) will contain a certain amount of any organic processing aid (22) used to pre-coat the filter surface. The preferred organic processing aid (22), where present, is a fibrous cellulosic material. Please note that a processing aid (22) is optional and if it is not used it will not be present in any downstream material.

In step C, which is optional, at least one additive (31) is added to bring the level of cellulosic material up to a predetermined level, this level is expected to be between 0.1% and 50%. This cellulosic material aids drying and improves the handling characteristics of the final product. At least one additive (31) and sludge filter cake (30) are blended/mixed to form a sludge putty (40) ready for extrusion. The at least one additives (31) added can be nutrient supplements, micronutrients, drying or anti-caking agents, colourants, odour modifiers, minerals, stabilisers for example.

In step D the sludge putty (40), which will be the sludge filter cake (30) when step C is not undertaken, is extruded to form PD sludge (50). This extrusion uses an extruder with one or more apertures with a maximum trans-axial cross sectional dimension in the range of between 0.1 mm and 40 mm. For example the sludge putty (40) may be passed through a mesh like structure to form a multitude of bars of PD sludge (50), though the cross-section of these bars may not be oval or round. These bars expand with the drop in pressure on exit from the die. This extrusion process is normally a low shear extrusion process that occurs at a low, less than 50° C., and preferably below 35° C., temperature to minimise or eliminate any breaking of the oil/fat.

In step E the sludge putty (50) is dried to a pre-determined moisture content to form a dried product (60). This drying is an important part of the process as the wrong conditions can cause breaking of the oil/fats. One method of carrying out this low temperature drying uses high volumes of air of low temperature (below 50° C.) air passing over the PD sludge (50). It is thought that some of the drying technology used for pasta drying may be successful but this is yet to be confirmed.

After step E additional steps may be undertaken to further process, size and package the dried product (50) to form the final product (21). These steps may include the addition of silica, absorbents, palatability aids or other additives. It is likely that prior to packaging the moisture content of the final product will be determined.

In certain variations the RDV filter (4) can be replaced by an alternative vacuum filtration or mechanical water removal device.

It should be noted that although the term organic processing aid (22) is used it may be, or contain, an inorganic processing aid which is does not detrimentally affect the resultant final product (21) quality.

Though the final product (21) has been described with reference to the creation of an animal food or feed supplement it is believed that by using a cellulosic or lignocellulosic processing aid the final product (21) can be used as a fuel for part or all of the onsite energy demands. Where mineral based processing aids are used they can cause undesirable deposits or serve as a flux to lower the melting point of fire bricks used inside furnaces/boilers. It is believed that other organic processing aids will also be suitable for the formation of a fuel or fuel supplement as a final product (21).

Though an organic processing aid (22) is used in the RDV filtration step it may be possible to filter/dewater the aged sludge (20) by simply using a filter cloth without this.

The organic processing aid (22) may be omitted from the filtration/dewatering step and added as a specific additive to form the sludge putty (40).

In some cases it has been found that introducing a milling or size reduction step after the drying produces a particularly useful product. During this size reduction step a number of additives may be introduced to maintain the product quality.

Where a temperature is provided, and it is indicated that the temperature should be no more than this, it is intended that a lower temperature may be substituted, for example below about 50° C. could be replaced by any temperature between 0° C. and 49° C. as the process will operate with that maximum bounding temperature as it is below the initially specified temperature. A temperature of no more than, or below, or a maximum of, 35° C. can be replaced by 30° C., 25° C., 20° C., 18° C., 15° C., 10° C. or below (or any temperature between). The same applies for the percentage of a specific ingredient, less than or up to about 35% can be replaced by 30%, 25%, 20%, 15% 10% or any other figure below 35%.

Best Mode For Carrying Out The Invention

Figure 3:
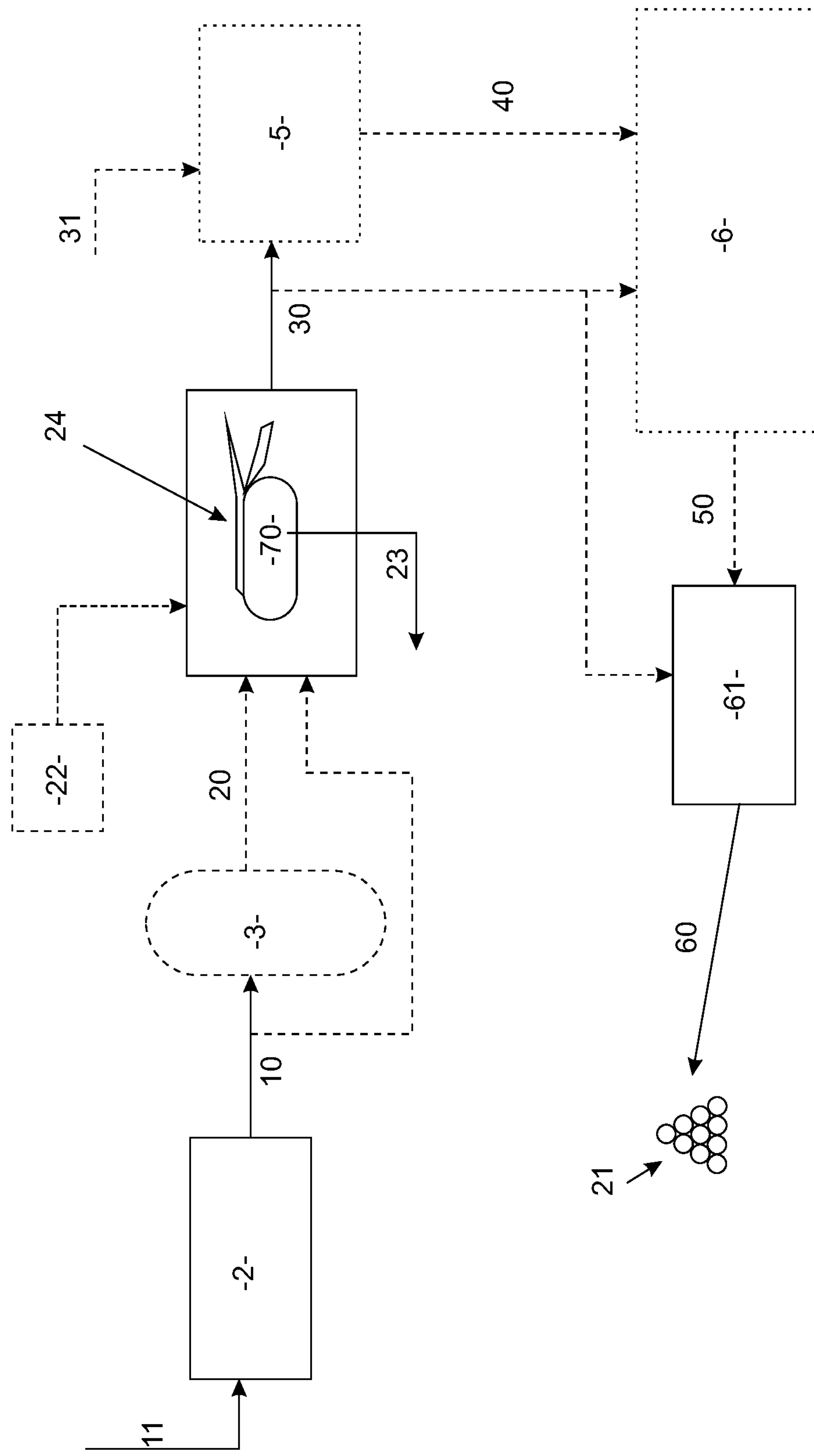
FIG. 3 is a process diagram of a second embodiment.

Referring FIG. 3 a process diagram of a second embodiment of the dairy waste material process plant (1) is shown. The dairy waste material process plant (1) includes:

a dissolved air flotation (DAF) plant (2);
a sludge tank (3);
a dewatering unit (70);
an optional additive unit (5);
an optional extrusion apparatus (6); and
a drier (61).

In this embodiment the sludge (10) or aged sludge (20) is filtered using a dewatering unit (70). This dewatering unit (70) is preferably a horizontal vacuum filter table. The dewatering unit (70) can be used with a 50 micron or less filter cloth, with or without a processing aid (22). The dewatering unit (70) processes the sludge (10) or the aged sludge (20) to form a sludge filter cake (30). Prior to processing in the dewatering unit (70) the feed material (10, 20) may be diluted with water and/or filtrate (23) to be sufficiently fluid to be processed.

It has been found that this addition of water and/or filtrate (23) can improve the effectiveness of this filtration/dewatering stage. The water or filtrate added is preferably at a low temperature, below about 25° C. or 30° C. or lower. As with the first embodiment above it is not yet understood what the added water or filtrate (23) does. Trials so far have shown that the addition of up to about 35% water (chilled) can improve the dewatering step, why this addition of water improves the removal of water during the filtration stage is not yet understood. Trials are ongoing to determine the useful range of added water and it may be that the amount added is related to the concentration of one or more chemical species in the aged sludge (20), the breakdown of flocculated material allowing interstitial water to be removed, reduced viscosity of the material to be processed, or a combination of these and other parameters, but this has not been determined.

The sludge (10) and aged sludge (20) has a variable composition which includes low melting point species, likely to be triglycerides of fatty acids. It has been found that this variable composition affects this filtration, and to prevent breaking of the oil/fat it is best carried out below 30° C. The optimum processing conditions are expected to be below 20° C., possibly between 2° C. and 18° C. This low temperature filtration has been found surprisingly effective, and the industry has been carrying out filtration at elevated temperatures, >45° C. with limited or no success, so success at low temperatures was not expected.

A particular advantage of using a horizontal belt vacuum filter or rotary drum vacuum filter (or any other suitable vacuum/low pressure filter) as the dewatering unit (70) is that the resultant sludge filter cake (30) can be dried directly without extrusion, providing the thickness of the sludge filter cake (30) does not exceed about 10 mm. To further process the sludge filter cake (30) needs to be sufficiently coherent to not flow under its own mass, it can to a certain extent deform, break or crumble, but not flow.

If the sludge filter cake (30) is then optionally blended with one or more additives (31) in additive unit (5) to form a sludge putty (40). Then consistency of the sludge filter cake (30) is less important and the sludge putty (40) needs to have the required coherency. The additives (31) could include silica, modified starch, modified carbohydrates, carbohydrates, marine or rice hulls, cellulose, high surface binding agents, minerals, micronutrients, anti-caking agents, absorbents, etc. The full range of additives (31) is yet to be determined but cellulose and various absorbents have been found to assist with the later drying and handling stages. It is felt that organic additives (31) are preferable.

If sludge putty (40) is formed then it can be directly dried if it has a maximum thickness of material, when processing dairy DAF, of about 10 mm (say up to 12.5 mm or 0.5") and the surface area to volume ratio is preferably 3:5 or greater.

If the sludge putty (40) is then extruded through the extrusion apparatus (6) it forms the PD sludge (50) as the extrudate. It has been found that the sludge putty (40) should optimally be sufficiently coherent to not flow under its own mass, it can to a certain extent deform, break or crumble, but not flow.

Where used the extrusion apparatus (6) should have a die with a maximum trans-axial die aperture cross sectional dimension of between 0.1 mm and 40 mm, where a solid rather than tubular extrudate is being formed. The optimum range believed to be between 1 mm and 5 mm unless hollow/tubular extrudate is formed. As the sludge putty (40) is extruded it expands forming the PD sludge (50). To aid with later processing it is beneficial to have corrugations on the surface of the PD sludge (50) though these can be formed purely by the expansion upon exit from the die, be part of the die aperture shape or a combination of these.

It has been found that there is a preferred maximum thickness and range of surface area to volume for the sludge filter cake (30), sludge putty (40) or PD sludge (50) produced from dairy sludge prior to drying. The maximum thickness of material, when processing dairy DAF, is about 10 mm (say up to 12.5 mm or 0.5") and the surface area to volume ratio is preferably 3:5 or greater After extrusion the PD sludge (50) should be dried in a drier (61) to form a dried product (60) prior to any further processing and packaging required to form the final product (21). In some configurations the undried sludge filter cake (30), sludge putty (40) or PD sludge (50) can be the final product (21), or used to prepare the final product (21).

This drying may be possible by natural air drying but air drying with a high volume of low temperature (below 200° C.) air is one preferred method. It should be noted that this low temperature air is most likely to be below 50° C. but may include an initial burst of air at a temperature of up to say 200° C./250° C. A variety of other low temperature drying options could also be used. Fluidised bed drying is being investigated as are a variety of infra-red/solar/dehumidification/rf/microwave/low pressure drying technologies and the final solution is likely to be a combination of these. It has been found that drying to 20% or below moisture content is preferred, but less than 5% appears to have additional benefits. Typically when the raw feedstock is dairy DAF this is around 96% solids The as the PD sludge (50) is dried to form the dried product (60) physical and/or chemical changes appear to occur that reduce or eliminate the breaking of the oil/fat even when the dried product is exposed to elevated (above 25° C.) temperatures.

Figure 4:
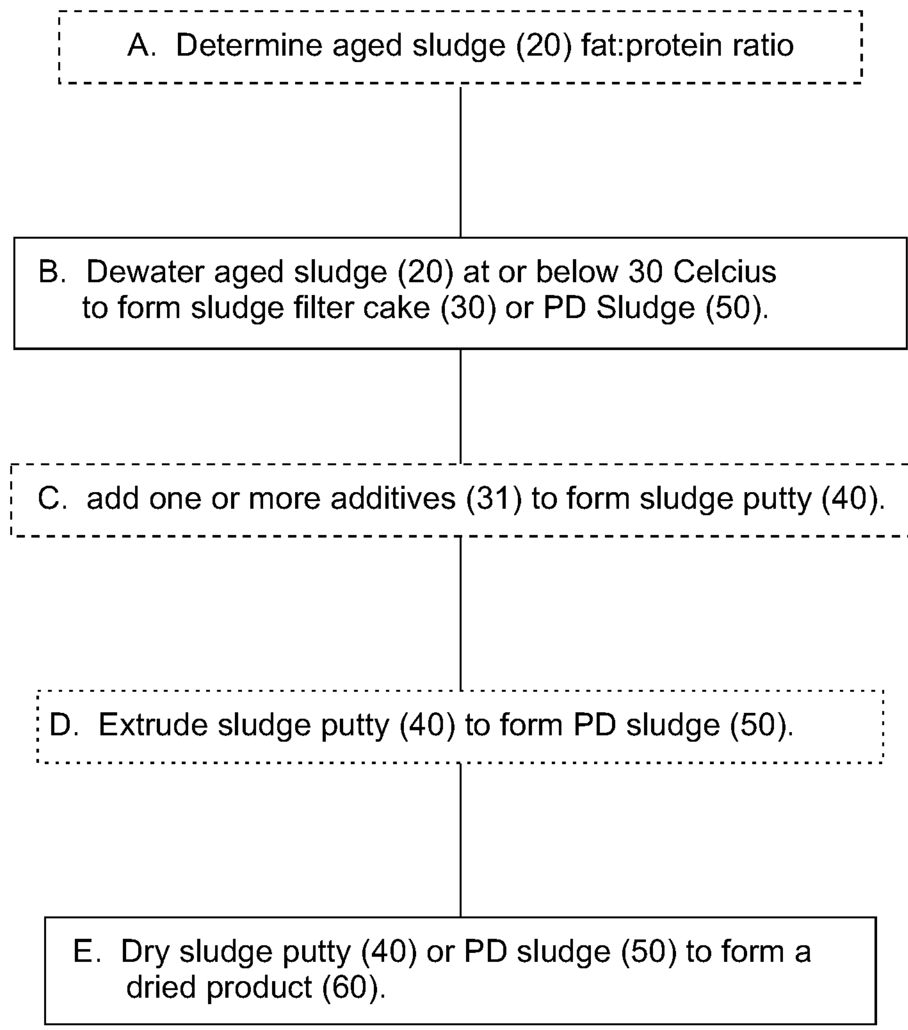
FIG. 4 is a flow chart of a preferred method of using the second embodiment of the processing equipment.
Figure 5:
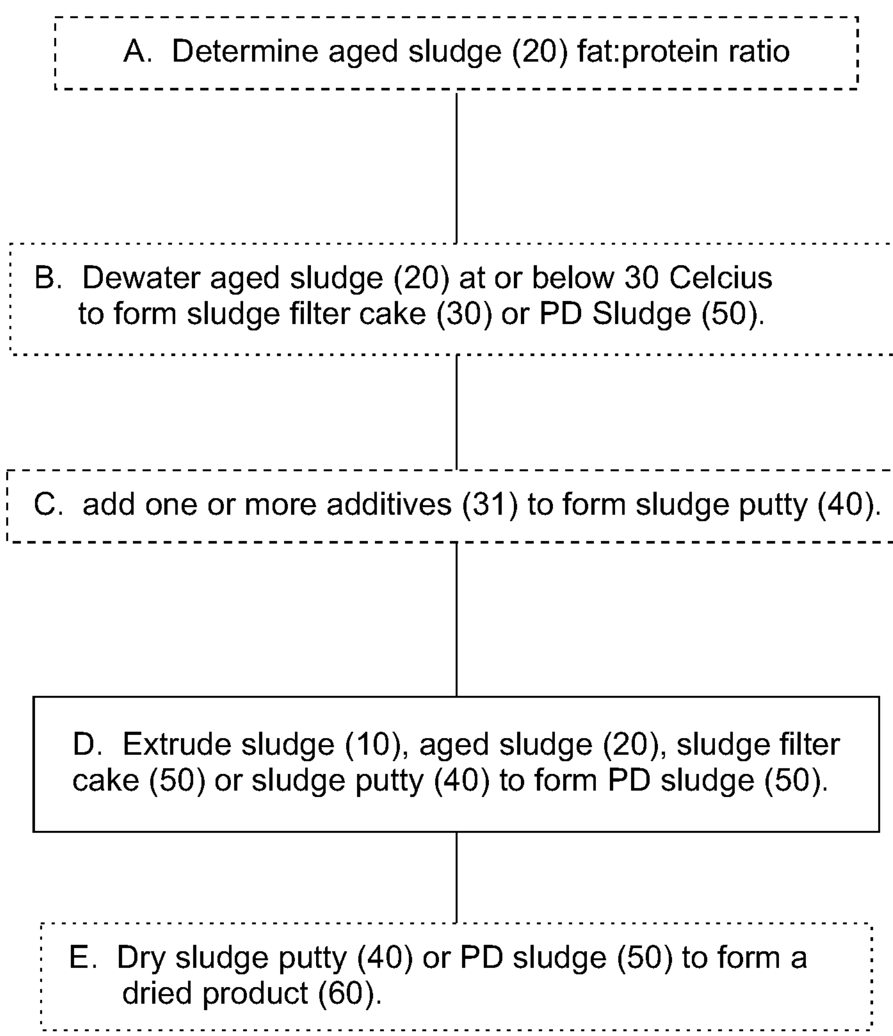
FIG. 5 is a flow chart of a third embodiment of the method which has only an extrusion step, with the other steps optional.

Referring to FIG. 4 the present invention also includes a preferred method of using the second embodiment of the dairy waste material process plant (1). The steps in dashed boxes are optional and may not always be present.

The method includes the following steps in order:

A. Determine aged sludge fat:protein ratio (optional);

B. Dewater aged sludge to form sludge filter cake;

C. Add additive (optional);

D. Extrude (optional); and

E. Dry (optional, though normal).

Where, in step A, which is optional, the fat to protein ratio of the aged sludge (20) is determined by any known means. It is possible that the sludge (10) fat to protein ratio is used but this may not take into account any changes that occur during aging, so is unlikely to be used except where the aging is between 0 and 3 days, or the sludge (10) is directly processed.

In step B the sludge (10) or aged sludge (20) is mechanically dewatered, preferably by some form of vacuum filter, but any suitable mechanical dewatering process, including centrifuges and vacuum filtration units, can be used. Essentially this creates a sludge filter cake (30). This sludge filter cake (30) may contain a certain amount of any organic processing aid (22) if this is used. This dewatering occurs with the sludge (10) or aged sludge (20) at 30° C. or lower. Prior to this mechanical dewatering using the dewatering unit (70) chilled water and/or filtrate (23) may be added. Where the dewatering unit (70) produces a flat sheet of sludge filter cake (30) about 10 mm or less thick then this can be divided into portions with a surface area to volume ratio of 3:5 or greater. This sludge filter cake (30) may be the final product or, if desired, step B can be followed by any of steps C to E directly.

Step B is optional if the sludge (10) or aged sludge (20) has undergone a pre-processing step that results in the formation of a pre-processed sludge which is sufficiently coherent to not flow under its own mass, it can to a certain extent deform, break or crumble, but not flow.

In step C, which is optional, at least one additive (31) is added to bring the level of cellulosic material up to a predetermined level, this level is expected to be between 0.1% and 50%. This cellulosic material aids drying and improves the handling characteristics of the final product. The at least one additive (31) and sludge filter cake (30) are blended/mixed to form a sludge putty (40) ready for extrusion. The at least one additives (31) added can be nutrient supplements, micronutrients, drying or anti-caking agents, colourants, odour modifiers, minerals, stabilisers for example.

In step D, which is optional, the sludge putty (40), which will be the sludge filter cake (30) when step C is not undertaken, is extruded to form PD sludge (50). This extrusion uses a an extruder (for example a forming extruder) with one or more apertures with a maximum trans-axial cross sectional dimension in the range of between 0.1 mm and 40 mm. For example the sludge putty (40) may be passed through a mesh like structure to form a multitude of bars of PD sludge (50), though the cross-section of these bars may not be oval or round. These bars expand with the drop in pressure on exit from the die. This extrusion process is carried out at a temperature of less than about 50° C., and preferably below 35° C. (this temperature may be 30° C., 25° C., 20° C. or even 15° C.), to minimise or eliminate any breaking of the oil/fat.

In step E, which is optional but preferred, the sludge putty (50), or alternatively the sludge filter cake (30), is dried to a pre-determined moisture content to form a dried product (60). This drying can cause the fats/oils to break from the drying material which is undesirable; as such the drying stage should be a low temperature drying stage. One method of carrying out this low temperature drying uses high volumes of air of low temperature (below about 50° C.) air passing over the PD sludge (50), or if not present the sludge filter cake (30) or sludge putty (40).

After step E additional steps may be undertaken to further process, size and package the dried product (50) to form the final product (21). These steps may include the addition of absorbents, palatability aids or other additives. It is likely that prior to packaging the moisture content of the final product will be determined.

The variations applicable to the first embodiment are also applicable to this second embodiment.

For any of the embodiments, or the variations of these, the sludge filter cake (30), sludge putty (40), PD sludge (50) or dried product (60) could all be the final product (21). In addition the method or process plant (1) may produce more than one final product (21) selected from sludge filter cake (30), sludge putty (40), PD sludge (50), dried product (60) or these materials further processed.

Where a step uses aged sludge (20) it could equally be sludge (10) or a pre-processed sludge. The pre-processed sludge may for example be sludge (10) or aged sludge (20) blended with an additive, had some of the oils and/or fats removed or been otherwise mechanically and/or chemically treated. The pre-processing steps most likely to have been undertaken are one or more of the following: the mechanical (centrifuging for example) removal of a proportion of the fats or oils, the addition of water and/or filtrate and the addition of a additive.

Referring to FIG. 3 a third alternative embodiment of the method is shown as a flowchart, in this case the sludge (10) or aged sludge (20) or pre-processed sludge is sufficiently coherent to not flow under its own mass, as such step A and the low temperature filtration, step B, can be omitted. This means that for this third embodiment only step C or step C and D are undertaken. This method is likely to be used where the low temperature fat and/or oil concentration has been reduced so that this level of coherency has been achieved.

This alternative may be limited to where an upstream process has removed a proportion (up to 100%) of the fats and oils.

Please note that there are dissolved air flotation wastewater processing plants used on non-animal (includes poultry and fish) wastewater, and this DAF sludge can also be processed. These DAF plants usually process wastewater from plants (including vegetable, fruit, trees, seaweed, and similar sources) material.

EXAMPLES

These tables summarise the effect of physical characteristics or processing conditions used to determine the ranges suitable for dairy DAF waste material. These ranges are likely to apply for DAF waste from other animal product, or animal, processing plants depending on the fats/oils present and the fat:protein ratio.

TABLE 1

Effect of surface area to volume ratio on drying effectiveness

| Shape | D1 | D2 | D3 | SA | Vol. | Ratio | Drying effectiveness |
|---|---|---|---|---|---|---|---|
| Cube | 40 | 40 | 40 | 9600 | 64000 | 3:20 | Undried in centre. |
| Cube | 10 | 10 | 10 | 600 | 1000 | 3:5 | OK |
| Cylinder | 2 | 20 | | 131 | 63 | 131:62 | Good |
| slice | 0.1 | 30 | 5 | 307 | 15 | 307:15 | Good |

All dimensions are in mm, $mm^2$ or $mm^3$, length, area and volume respectively.
D = diameter or length, SA = Surface Area, Vol. = Volume, Ratio = SA to Vol. ratio.

TABLE 2

Effect of Dewatering Temperature:

| Temperature (° C.) | Comment |
|---|---|
| 3 | Clear filtrate with good filtration efficacy |
| 8 | Clear filtrate with good filtration efficacy |
| 15 | Clear filtrate with good filtration efficacy |
| 20 | Clear filtrate with acceptable filtration efficacy |
| 40 | Unacceptable filtration efficacy, product may be acceptable. |

30° C. is felt to be acceptable for many applications, but not definitive.

TABLE 3

Effect of Air Drying Temperature on Product Quality

| Temperature (° C.) | Comment |
|---|---|
| 10 | Dry with stable product output |
| 20 | Dry with stable product output |
| 30 | Dry with stable product output |
| 40 | Dry with stable product output |
| 50 | Dry but product output varies depending on fat:protein ratio |
| 70 | Possibly dry but appears to denature. |

As the fat content decreases and protein content increases higher temperatures are tolerated. At 50° C. the throughput needs to be managed to obtain a high quality dry product.

KEY

1. Dairy waste material process plant;
2. DAF (dissolved air flotation) plant;
3. sludge tank;
4. rotary drum vacuum (RDV) filter;
5. additive unit;

6. extrusion apparatus;
10. sludge;
11. dairy wastewater stream;
20. aged sludge;
21. final product;
22. organic processing aid;
23. filtrate (RDV filter high liquid content phase);
24. retentate (RDV filter high solids phase);
30. Sludge filter cake (retentate+processing aid if present);
31. Additives;
40. Sludge putty (sludge filter cake with/without additives) prior to extrusion;
50. PD sludge;
60. Dried product;
61. Drier;
70. Dewatering unit;

The invention claimed is:

1. A method of producing a dried product from a wastewater dissolved air flotation (DAF) sludge that includes triglycerides of fatty acids, wherein said method comprises first obtaining a wastewater DAF sludge followed by the following steps in order:

(i) one step selected from the list consisting of steps (a), (b), (c) and (d):
 (a) proceed directly to step (ii) without storing the wastewater DAF sludge to produce aged sludge or processing either the wastewater DAF sludge or aged sludge to produce processed sludge;
 (b) store the wastewater DAF sludge for a period of time to form aged sludge;
 (c) process the wastewater DAF sludge to form pre-processed sludge; and
 (d) store the wastewater DAF sludge for a period of time to form aged sludge then process the aged sludge to form pre-processed sludge;

(ii) carry out a dewatering step which is the mechanical dewatering of the wastewater DAF sludge, aged sludge or pre-processed sludge, carried out at 20 degree C. or less, to produce a sludge filter cake that does not flow under its own mass;

(iii) one step selected from the list consisting of (e), (f) (g) and (h):
 (e) proceed to step (iv);
 (f) blend the sludge filter cake with an organic processing aid to form a sludge putty;
 (g) extrude the sludge filter cake to form a PD sludge; and
 (h) blend the sludge filter cake with an organic processing aid to form a sludge putty then extrude the sludge putty to form a PD sludge;

(iv) carry out a drying step where the sludge filter cake, the sludge putty or the PD sludge is dried, in air at 50° C. or less, to form a dried product;

such that the wastewater DAF sludge is produced from a source selected from the list consisting of dairy wastewater, wastewater from an abattoir, wastewater from a meat processing plant, wastewater from a meat processing plant, wastewater from a fish processing plant and wastewater from a poultry processing plant.

2. The method as claimed in claim 1, wherein the dewatering step is carried out at a temperature of between 2° C. and 18° C.

3. The method as claimed in claim 1, wherein the pre-processed sludge is sludge or aged sludge that has been diluted with water.

4. The method as claimed in claim 3, wherein the temperature of the water is below 20° C.

5. The method as claimed in claim 4, wherein the temperature is below 10° C.

6. The method as claimed in claim 3, wherein 35% (vol/vol) or less water and/or filtrate is added.

7. The method as claimed in claim 1, wherein the PD sludge has a maximum thickness of about 10 mm and a surface area to volume ratio of 3 $mm^2$/5 $mm^3$ or greater.

8. The method as claimed in claim 1, wherein the dewatering step is followed by an extrusion step in which the filter cake or sludge putty is extruded to form the PD sludge, in which the PD sludge has a maximum thickness of about 10 mm and a surface area to volume ratio of 3 $mm^2$/5 $mm^3$ or greater.

9. The method as claimed in claim 8, wherein the extrusion step is a low shear extrusion step.

10. The method as claimed in claim 8, wherein the extrusion step is carried out using an extruder which includes a die which has one or more die apertures that have a maximum trans-axial cross sectional dimension of between 0.1 mm and 40 mm.

11. The method as claimed in claim 10, wherein the maximum trans-axial cross sectional dimension is between 1 mm and 10 mm.

12. The method as claimed in claim 11, wherein the maximum trans-axial cross sectional dimension is between 1 mm and 5 mm.

13. The method as claimed in claim 1, wherein the PD sludge has a maximum thickness of about 10 mm and a surface to volume ratio of 3 $mm^2$/5 $mm^3$ or greater.

14. The method as claimed in claim 1, wherein the drying is carried out using air at or below 30° C.

15. The method as claimed in claim 1, wherein the dried product has greater than 90% solids.

16. The method as claimed in claim 1, wherein the dried product is further processed to form a final product.

17. The method as claimed in claim 16, wherein the final product is selected from the list consisting of a feed for animals, a feed supplement for animals, a fuel for energy or heat production and a fuel supplement for energy or heat production.

18. The method as claimed in claim 1, wherein the pre-processed sludge is a sludge or aged sludge that has had a proportion of the oils and fats removed.

19. The method as claimed in claim 1, wherein the aged sludge is sludge that has been stored in a tank from 0 to 40 days.

* * * * *